United States Patent
Charnell

(10) Patent No.: US 7,207,036 B2
(45) Date of Patent: Apr. 17, 2007

(54) PREPROCESSING OF INTERFACES TO ALLOW FAST CALL THROUGH

(75) Inventor: William Charnell, Geat Missenden (GB)

(73) Assignee: Esmertec AG, Dubendorf (CH)

( * ) Notice: Subject to any disclaimer, the term of this patent is extended or adjusted under 35 U.S.C. 154(b) by 834 days.

(21) Appl. No.: 10/203,151

(22) PCT Filed: Feb. 7, 2001

(86) PCT No.: PCT/IB01/00728

§ 371 (c)(1),
(2), (4) Date: Dec. 3, 2002

(87) PCT Pub. No.: WO01/52654

PCT Pub. Date: Aug. 9, 2001

(65) Prior Publication Data

US 2003/0154467 A1 Aug. 14, 2003

Related U.S. Application Data

(60) Provisional application No. 60/180,516, filed on Feb. 7, 2000.

(51) Int. Cl.
*G06F 9/45* (2006.01)
*G06F 9/44* (2006.01)
(52) U.S. Cl. ........... 717/140; 717/143; 717/150; 717/151
(58) Field of Classification Search ........ 717/106–109, 717/140–161, 162; 707/4
See application file for complete search history.

(56) References Cited

U.S. PATENT DOCUMENTS

| 5,640,550 | A | * | 6/1997 | Coker | 707/4 |
| 5,774,728 | A | * | 6/1998 | Breslau et al. | 717/141 |
| 6,066,181 | A | * | 5/2000 | DeMaster | 717/148 |
| 6,282,702 | B1 | * | 8/2001 | Ungar | 717/148 |
| 6,542,900 | B1 | * | 4/2003 | Xia | 707/103 Y |
| 6,654,950 | B1 | * | 11/2003 | Barnishan | 717/136 |
| 6,779,188 | B1 | * | 8/2004 | Blandy et al. | 719/331 |
| 6,930,695 | B1 | * | 8/2005 | Pabla | 715/805 |
| 6,988,263 | B1 | * | 1/2006 | Hussain et al. | 717/128 |
| 2002/0013936 | A1 | * | 1/2002 | Li | 717/5 |

OTHER PUBLICATIONS http://java.sun.com/j2se/1.3/docs/guide/awt/AWT_Native_Interface.html, accessed on Feb. 6, 2006, pp. 1-11.*

(Continued)

*Primary Examiner*—Wei Zhen
*Assistant Examiner*—Satish S. Rampuria
(74) *Attorney, Agent, or Firm*—Caesar Rivise Bernstein Cohen & Pokotilow

(57) ABSTRACT

A solution to avoid performance degradation associated with load-object independence by arranging interface source code, particurlarly JNI source code, in a stylized form, and then preprocessing the stylized interface source code into a Virtual Machine ("VM") specific form. The stylized source code allows a preprocessor to identify and track field and method identifiers, and to match up the field and method uses with the specification of the field or method. The source code is stylized by substituting stylized variable names, each with a native element identifier, for non-stylized variables.

7 Claims, 4 Drawing Sheets

OTHER PUBLICATIONS http://java.sun.com/j2se/1.3/docs/guide/jni/jni-12.html, accessed on Feb. 6, 2006, pp. 1-9.*

Atkins et al., Using version control data to evaluate the impact of software tools, IEEE, May 1999 pp. 324-333.*

Oldenburg, OSF Motif: the user interface standard, IEEE, Nov. 1989 pp. 2/1-2/8.*

Eisenbach et al., Changing Java programs, IEEE, Nov. 2001, pp. 479-487.*

Rinaldo Di Giorgio, "Use native methods to expand the Java environment", JAVA World, Online!, Jul. 1997.

M. Karaorman et al., "jContractor:a reflective Java library to support design by contract", Meta-Level Architectures and Reflection, 2d International Conf., Reflection '99 Proceedings, Saint-Malo France, 'Online!, vol. 1616, Jul. 1999.

L. J. Dyadkin, "Multibox Parsers", ACM Sigplan Notices, Assoc. for Computing Machinery, New York, USA, Online!, vol. 29, No. 7, Jul. 1994.

JAVASOFT, "Java Native Interface Specification Release 1.1", Online!, Sun Microsystems, Inc., Mountain View, California, May 16, 1997.

* cited by examiner

PREPROCESSING OF INTERFACES TO ALLOW FAST CALL THROUGH

The present invention claims the benefit of U.S. Provisional Application Ser. No. 60/180,516 entitled "PREPROCESSING OF JNI INTERFACES IN LIBRARIES TO ALLOW FAST CALL THROUGH" filed Feb. 7, 2000 which is incorporated by reference herein in its entirety.

BACKGROUND OF THE INVENTION

The present invention relates to preprocessing computer source code. More specifically, the invention relates to preprocessing native interface source code.

Java™ is an object-oriented computer programming language. It is most commonly used in Internet applications where Java™ programs are called from within HTML documents. However, Java™ programs can also be launched as stand alone applications.

Before it is executed, Java™ source code is usually translated or compiled into byte code by a Java™ compiler. The byte code is then interpreted or converted to machine language at run time. Java™ can be implemented as an interpreted language, meaning programs written in Java™ can be run using an interpreter. An interpreter translates and runs a program at the same time. Specifically, the interpreter translates one line of programming, executes that line of code, and then proceeds to the next line of code.

The Java™ Virtual Machine ("VM") carries out the task of interpreting or otherwise executing the Java™ byte code. Java™ VMs are present in most browsers and widely licensed for use in a variety of computing devices. In fact, Java™ VMs are so widely distributed that Java™ is said to offer "write once, run anywhere" portability. With most other programming languages, different versions of a program must be developed for different computer environments. Further, Java™ programs can be stored in relatively small files, which is important in applications where memory is limited (e.g., when running software on cell phones, personal digital assistants, and the like) and makes transmitting the programs over networks easier and faster.

While it is possible to create a computing environment specifically designed for Java™ (e.g., by using a Java™ chip), most Java™ platforms are deployed on top of a non-Java™ host environment that employs a standard processor with a Java™ VM installed in memory. A Java™ platform is a programming environment that includes the Java™ VM and the Java™ application programming interface ("API"). The Java™ API consists of a set of predefined classes.

Java™ also includes a programming interface known as the Java™ Native Interface ("JNI"). The JNI provides a mechanism for calling native platform elements such as graphical user interface ("GUI") routines and integrating legacy software (existing code written in languages other than Java™) in a Java™ application. As is known, a native application is one specifically designed to run on the computing environment at hand (the operating system and machine language for particular hardware). The JNI allows Java™ elements incorporating or referencing native methods to be written and compiled in such a way that the resulting load object is independent of the Java™ Virtual Machine specifics, and can be used with any virtual machine that supports the JNI for that environment. However, the abstraction that the JNI layer provides to allow load-object independence imposes a performance penalty on both the entry and exit from the native method and also on the activities within the native method, where elements of the Java™ system such as fields, other methods, etc. need to be accessed from the native method.

SUMMARY OF THE INVENTION

Accordingly, there is a need for an improved method and system for calling native elements using a programming interface, such as the JNI. In particular, there is a need for an improved manner of calling native elements that does not impose performance penalties during execution.

In one embodiment, the invention provides a solution to performance degradation associated with load-object independence by arranging JNI source code in a stylized form, and then preprocessing the stylized JNI source code into a VM-specific form. The VM-specific form avoids much if not all the extra overhead imposed by standard JNI coding and processing. However, the stylized JNI source code can be built without the preprocessing step as standard JNI source. Therefore, it can be used with a variety of virtual machines.

The stylized JNI code allows the preprocessor to identify and track field and method identifiers, and to match up the field and method uses with the specification of the field or method. The stylized JNI also allows the Java™ object references to be tracked for Garbage Collection purposes. The preprocessor changes the name of the preprocessed native methods to allow the native method loading mechanism to distinguish between preprocessed JNI native methods and standard JNI native methods, which the VM may still encounter from third party load units.

The load unit produced from pre-processing the stylized JNI is tied to a specific VM (and indeed a particular version of that specific VM) due to the implied knowledge of the object layout and the direct access to various VM internal structures and routines.

As is apparent from the above, it is an advantage of the invention to provide a method and system of arranging JNI source code in a stylized form and then preprocessing that code into a VM-specific form, which reduces the overhead imposed by standard JNI coding and processing. Other features and advantages of the present invention will become apparent by consideration of the detailed description and accompanying drawings.

DETAILED DESCRIPTION

Figure 1:
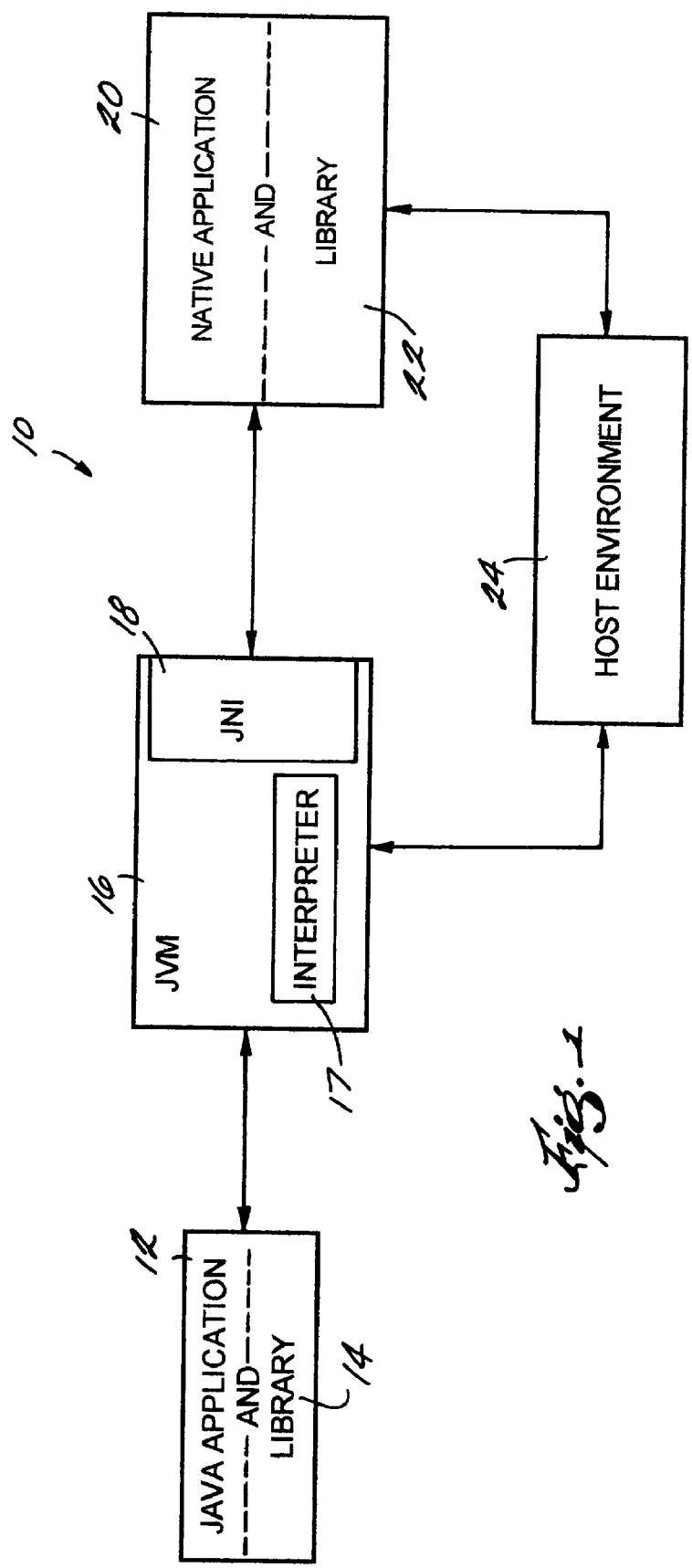
FIG. 1 is a schematic diagram of the interaction of a JNI with other components in a computing environment.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The following description assumes that the reader is familiar with computer science and has a working knowledge of Java™, C, and assembly programming languages, as one of ordinary skill in the art would possess.

FIG. 1 illustrates various components of a computing environment 10. The environment 10 includes a Java™ application 12 and an associated library 14 of executable program modules. A Java™ VM 16 having an interpreter 17 executes the Java™ application 12. The Java™ VM 16 also has a JNI 18, which interfaces with a native application 20 and an associated native library 22, which includes executable program modules for the native environment. The Java™ VM 16 and native application 20 (as compiled to create a dynamic link library, in the example shown) interact with a host environment 24 (the operating system and machine language for the particular hardware used).

The JNI 18 can be used to write native methods that allow Java™ applications to call functions implemented in the native library 22. The JNI 18 also supports an invocation interface that allows the embedding of a Java™ VM into native applications. For example, a web browser written in the C language can execute downloaded Java™ applets in an embedded VM.

Figure 2:
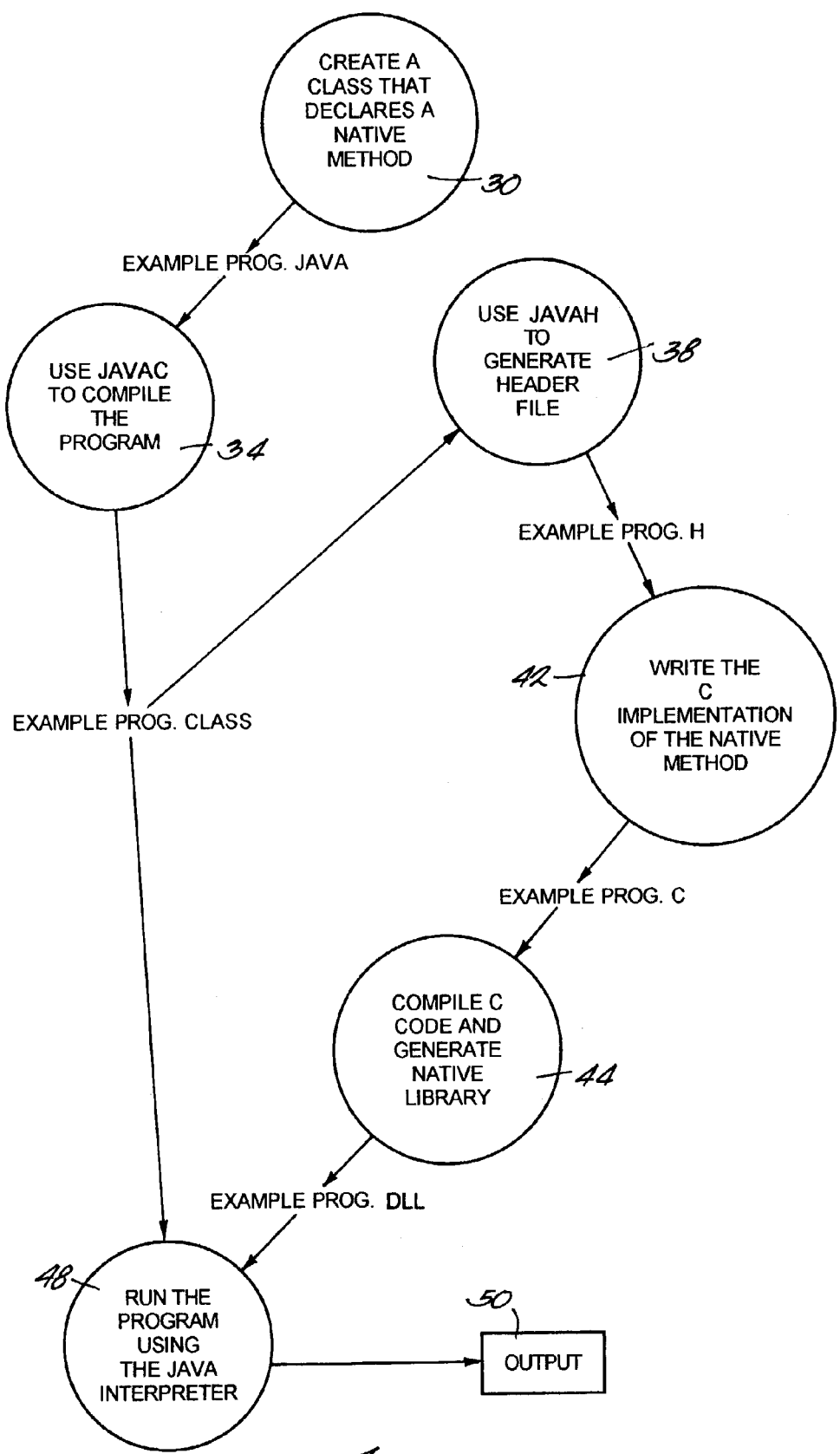
FIG. 2 is a flow diagram showing a typical process of running a Java™ application that calls a native function.

FIG. 2 illustrates a typical process of using the JNI 18 to run a Java™ application that calls a C function. As shown at step 30, a Java™ class ("exampleProg") that declares a native method is created. The Java™ class is then compiled at step 34 to generate a class file "exampleProg.class." At step 38, the Java™ header tool is used to create a header file "exampleProg.h." The C implementation of the native method ("exampleProg.c") (which could be any method, from a simple method to display text on a display to a complex method) is written at step 42. Once the native method is written, it is compiled to create a native library "exampleProg.dll," as shown at step 44. Finally, the Java™ program is run with the native library at step 48 to produce some end result or output 50.

As was noted above, the JNI allows native methods to access Java™ items and the Java™ VM machine. The JNI also allows native methods to be called and parameters to be passed to the native methods. The JNI does this in such a way that object code, as compiled from, for example, a C native method, is binary compatible with a variety of VMs. In order to provide this compatibility, the JNI introduces an abstraction layer, which is implemented through the JNI API set.

There are a number of factors to the abstraction introduced by the JNI. All the object references that the native method refers to are referred to through a specific type and subtypes of that type. The type is "JNI reference." This typically adds an extra level of indirection to native objects. When the native method wants to call a service of the VM, the native method calls through a function table, which is passed to the native method via one of the parameters to the native method. One of the native method parameters is a pointer to the JNI environment, and the JNI environment contains a pointer to the function table. Thus, load object compatibility results in multiple cases of indirection to get to a desired function. This allows native elements to operate without knowledge of the VM, but in exchange the JNI adds inefficiency by requiring many reference layers.

It has been found that if the particular VM that will be used in a particular situation is known and it is acceptable to restrict portability of the compiled JNI code, pre-processing of the native source to change JNI API calls into direct calls or direct macro access that perform operations in line (i.e., in a line of code) enhances efficiency.

According to one aspect of the invention, JNI code is written in a stylized form so that it is still legal or acceptable JNI syntax. However, the stylized form includes particular stylized names of variables, such as field identifiers and method identifiers. Furthermore, the stylized names include information regarding the use of the method or field. This permits identification of the field or method being referenced at the point in the code where the field or method is being used or called. This, in turn, provides more direct access to the field or method as compared to standard JNI coding.

Examples of how to code a stylized JNI method and a field are set out below.

| NOTATIONS | Code |
| --- | --- |
| | jmethodID x;<br>jclass cl; |
| Line A: | cl =(*env) → FindClass (env, "myClass"); |
| Variable x: | x = (*env) → GetMethodID<br>(env, cl, "getValue," "(I)V");<br>{ additional source } |
| Line B: | (*env)->CallVoidMethod (env, x, val);<br>to stylize use variable name myclass_get_value_IV_mID<br>instead of x |
| | jfieldID f;<br>jclass cl;<br>cl=(*env) → FindClass(env, "myClass"); |
| Line C: | f=(*env) → GetFieldID (env, cl, "value," "I");<br>y=(*env) → GetIntField(env, obj, f);<br>(*env)→SetIntField (env, obj, f, y+1);<br>to stylize use myClass_value_I_fID instead of f; Line C becomes<br>myClass_getvalue_I_fID =<br>(*env)->GetfieldID(env, cl, "value," "I"); |

As can be seen by reference to the method code above, when the JNI code is written with a stylized variable name, which contains a method identifier, rather than the variable "x," the code provides information to the processor, in this case a preprocessor (discussed below), such that when the preprocessor encounters the code it knows what method is actually being called. Thus, the preprocessor can convert the code into a more efficient form. In particular, the preprocessor can convert Line A such that it performs no operation and is able to convert Line B into an instruction that calls a method directly rather than going through the abstraction that JNI ordinarily imposes. A similar improvement is achieved for the field code set out above, where a field identifier is used rather that the variable "f."

Figure 3:
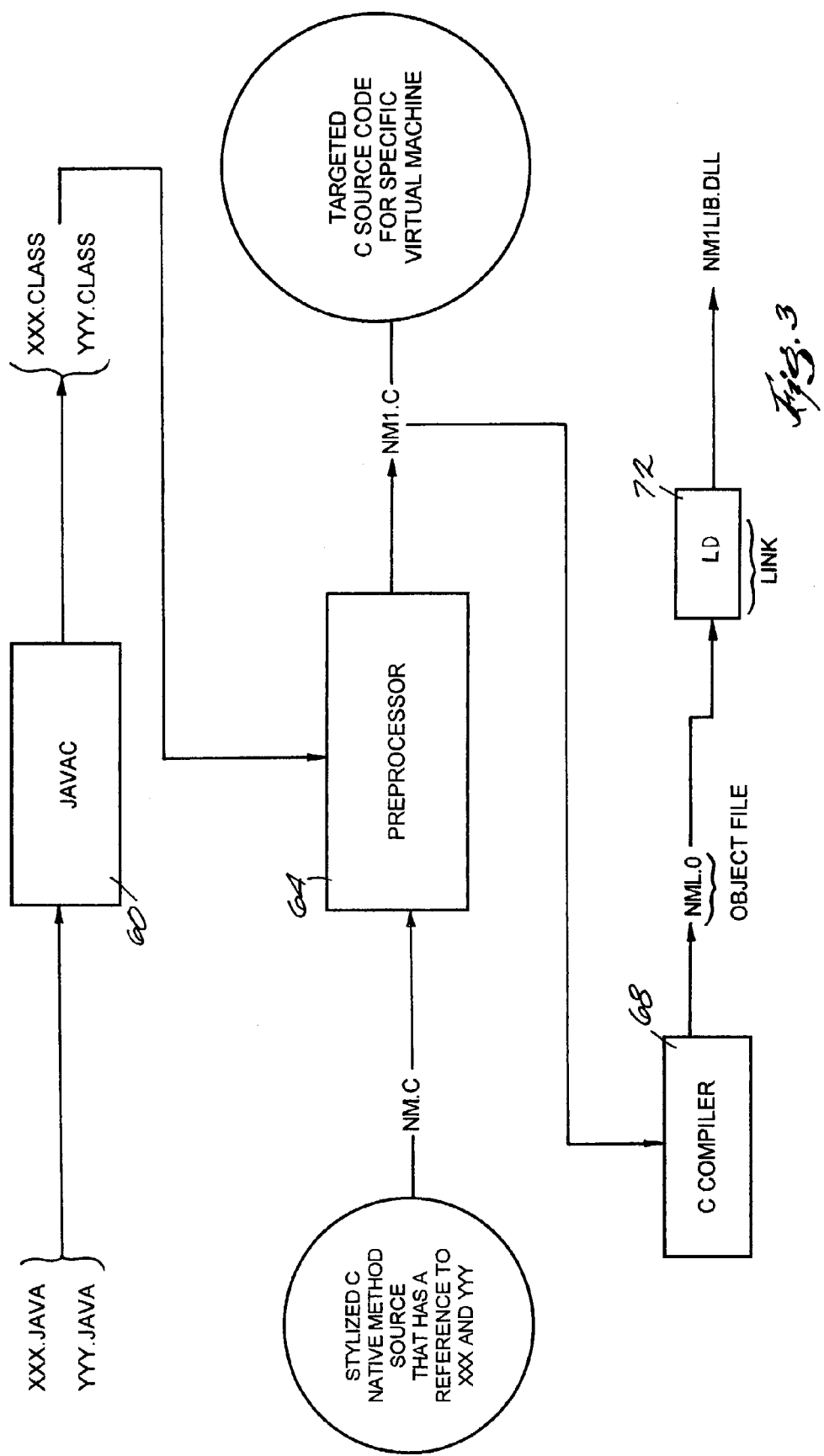
FIG. 3 is a flow diagram illustrating the use of a preprocessor according to one embodiment of the invention.

FIG. 3. illustrates the process of using preprocessing according to one embodiment of the invention. As shown in FIG. 3, exemplary Java™ class source "xxx. Java™" containing a field to be referenced from native code and class source "yyy. Java™" that contains a method to be referenced from native code are processed in a Java™ compiler 60 to generate class files "xxx.class" and "yyy.class," respectively. A stylized native method "nm.c" (as opposed to a non-stylized native application such as exampleProg.c, above) that refers to "xxx" and "yyy" is input to a preprocessor 64. The class files "xxx.class" and "yyy.class" are also input to the preprocessor 64. The preprocessor 64 generates targeted C source code, "nml.c." The targeted C source code "nml.c" is then compiled in a C compiler 68. In the embodiment illustrated, the compiler 68 generates an object file "nml.o," which is then linked in a linking process 72 to generate a dynamic link library "nml.dll." The library "nml.dll" can then be used in a manner similar to the library "exampleProg.dll" as shown at step 48 in FIG. 2, where the compiled Java™ classes referring to or including the native element are executed in the interpreter of the virtual machine.

Figure 4:
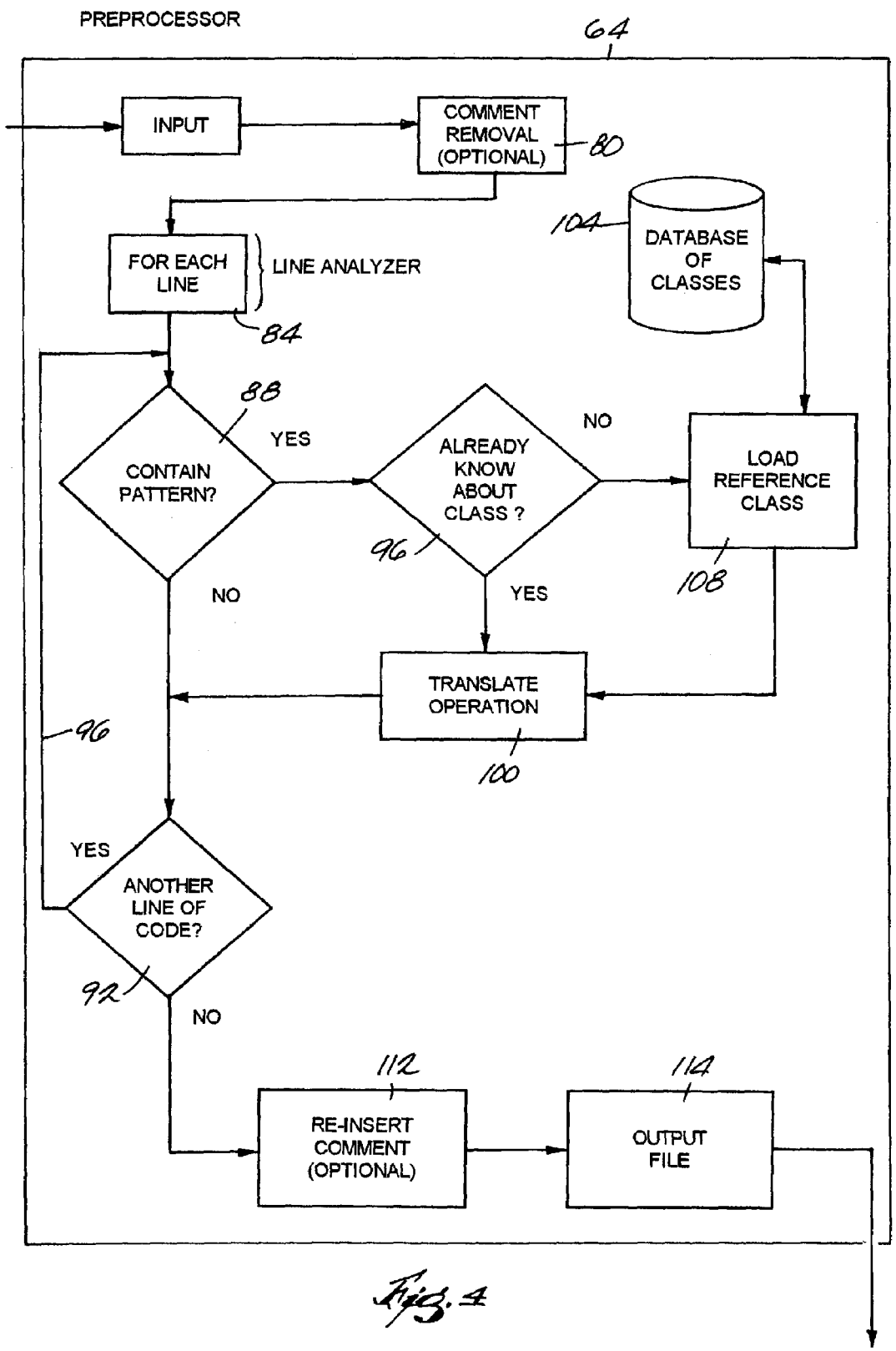
FIG. 4 is a flow chart of the processing that occurs in the preprocessor of one embodiment the invention.

The preprocessor 64 is illustrated in greater detail in FIG. 4. Input delivered to the preprocessor 64 may be processed in an optional comment removal module 80. The comment removal module 80 removes programming comments to make preprocessing of the source code easier. However, the removal of comments is not required. Preferably, the comment removal module 80 also tracks the location of the comments within the source code to assist in re-inserting the comments once preprocessing of the code is complete.

Following any comment removal, the preprocessor 64 begins the analysis of each line of JNI source code looking for particular patterns, in a line-by-line fashion. The code is delivered to a line analyzer 84 that looks for patterns that match the stylization used in the stylized JNI source, as shown at step 88. For example, "GetMethodID" would be an applicable pattern for the method code example described above. If the line of code does not contain a pattern of interest then the line analyzer 84 continues searching through the code until all patterns in all the lines have been found as shown in step 92 and by loop 96. If a pattern is found, then the line analyzer 84 determines whether the preprocessor has knowledge about the applicable class as shown at step 97. If the preprocessor 64 already knows the identified class, then a translation operation is performed in a translator 100 to convert the stylized code to a translated form with direct access to the relevant class. If the preprocessor does not have knowledge of the relevant class then information regarding that class is loaded from a database 104 of classes by a loading module 108. The code is then translated in the translator 100.

Once all the lines of code have been analyzed and translated as appropriate, the preprocessor re-inserts any comments it removed before the analysis using a comment inserter 112. Finally, a complete output file 114 including the comments, the JNI code that had no patterns, and the stylized portions of the JNI now in a translated form, is assembled and output by the preprocessor 64.

An example of stylized JNI in translated form, for an x86 environment is set out below. The stylized form of the source would be as the last two source lines of the previous field access example:

y=(*env)→GetIntField(env, obj, myClass_value_I_fID);
(*env)→SetIntField (env, obj, myClassvalue_I_fID, y+1);

which would be preprocessed to a form such as:

y=(*((int* *)obj))[5];
(*((int** *)obj))[5]=y+1;

The preprocessed version uses information which is specific to the VM to be used, namely that the real reference value can be obtained from the JNI reference of an object by a single de-reference, and that the "value" field in an object of the particular example class lies at 5 words, i.e. 20 bytes, into the object.

x86 assembly format as might be produced from the un-preprocessed source

| PUSH | [myClass_value_I_fID] | |
|------|------------------------|------|
| MOV  | EBX, 16 [EBP]          | ;env |
| PUSH | 12 [EBP]               | ;obj |
| PUSH | EBX                    | ;env |
| MOV  | ECX, [EBX]             | ;*env |
| CALL | 24[ECX]                | ;get "value" field |

-continued

| POP  | ECX                    | ;discard function parameters |
|------|------------------------|------|
| POP  | ECX                    | |
| POP  | ECX                    | |
| MOV  | 32 [EBP], EAX          | ;store value as C variable "y" |
| INC  | EAX                    | |
| PUSH | EAX                    | |
| PUSH | [myClass_value_I_fID]  | |
| PUSH | 12 [EBP]               | ;obj |
| PUSH | EBX                    | ;env |
| MOV  | ECX, [EBX]             | ;*env |
| CALL | 50 [ECX]               | ;set "value" field |
| POP  | ECX                    | ;discard function parameters |
| POP  | ECX                    | |
| POP  | ECX                    | |
| POP  | ECX                    | |

X86 assembly format as might be produced from preprocessed source

| MOV | EAX, 12 [EBP]  | ; obj JNI ref |
|-----|----------------|---------------|
| MOV | EAX, [EAX]     | ; real ref    |
| MOV | ECX, 20 [EAX]  | ; get "value" field |
| MOV | 32 [EBP], ECX  | ; store value as C variable "y" |
| INC | ECX            | |
| MOV | 20 [EAX], ECX  | ; set "value" field |

The example assembly code as produced from un-preprocessed source shows that the majority of the instructions, i.e., the first nine instructions and the last 10 instructions, are to perform two accesses to the "value" field of the object. These instructions prepare the parameters to the JNI API function call by pushing them on the stack, then call the JNI API function, and then discard the parameter values after the function call. Further to the instructions shown in the above example, the processor would need to execute the bodies of the two JNI API routines called to perform the desired operation. Conversely, the second version, as produced from preprocessed source, shows many fewer instructions needing to be executed, and no other routines needing to be called to perform the desired operation.

In the preparation of both examples, some assumptions have been made as to the layout of the C functions local variables in the functions frame, i.e. that the local variable "y" is stored at 32 bytes from the frame pointer and the "obj" variable is stored at 12 bytes from the frame pointer, which is held in the EBP register. The first version makes other assumptions about the C variable and structure access, such as access to the "env" function parameter and the offsets in the JNI API function vector to call the "GetIntField" and "SetIntField" JNI API functions.

As can be seen from the above, the invention provides a method and system arranging interface source code in stylized form and then preprocessing that code into a VM-specific form. Various features and advantages of the invention are set forth in the following claims.

What is claimed is:

1. A method of executing an application having a native element and a legal syntax in a computing environment having a native interface and a virtual machine, the method comprising:

compiling the application to create a compiled version of the application;

creating a stylized version of the native element while maintaining the legal syntax, the stylized version of the native element including stylized names of variables and field and method identifiers for identifying the native element at a point in the application where the native element is used and a reference to the application;

passing the compiled version of the application and the stylized version of the native element to a preprocessor;

generating a targeted version of the native element in the preprocessor; and compiling the targeted version of the native element.

2. A method as claimed in claim 1, further comprising:

generating a library from the targeted version of the native element; and passing the library and the compiled version of the application to an interpreter.

3. A method as claimed in claim 1, wherein generating a targeted version of the native element includes using information that is specific to the virtual machine.

4. A method as claimed in claim 1, wherein the computing environment includes interface source code further comprising:

preprocessing the stylized version of the interface source code;

examining each line of the interface source code for a predetermined pattern associated with a stylized variable name;

determining whether class information regarding the stylized variable name associated with the predetermined pattern is known; and translating the line of code to a translated form if class information is known.

5. A method as claimed in claim 4, wherein preprocessing the stylized version comprises removing comments from the interface source code before examining each line of the interface code.

6. A method as claimed in claim 4, further comprising loading class information from a database of classes if class information regarding the stylized variable name associated with the predetermined pattern is not known.

7. A method as claimed in claim 5, wherein preprocessing the stylized version of the interface source code comprises reinserting comments into the interface code after translating each line of code.

* * * * *